US010754808B2

(12) United States Patent
Sethi et al.

(10) Patent No.: US 10,754,808 B2
(45) Date of Patent: Aug. 25, 2020

(54) BUS-DEVICE-FUNCTION ADDRESS SPACE MAPPING

(71) Applicant: Intel Corporation, Santa Clara, CA (US)

(72) Inventors: Prashant Sethi, Folsom, CA (US); Michael T. Klinglesmith, Portland, OR (US); David J. Harriman, Portland, OR (US); Reuven Rozic, Binyamina (IL); Shanthanand Kutuva Rabindrananth, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/572,436

(22) PCT Filed: Dec. 20, 2015

(86) PCT No.: PCT/US2015/066956
§ 371 (c)(1),
(2) Date: Nov. 7, 2017

(87) PCT Pub. No.: WO2016/178717
PCT Pub. Date: Nov. 10, 2016

(65) Prior Publication Data
US 2018/0137074 A1 May 17, 2018

Related U.S. Application Data
(60) Provisional application No. 62/158,456, filed on May 7, 2015.

(51) Int. Cl.
*G06F 13/40* (2006.01)
*G06F 13/42* (2006.01)
(Continued)

(52) U.S. Cl.
CPC ........ *G06F 13/404* (2013.01); *G06F 12/1009* (2013.01); *G06F 12/1081* (2013.01);
(Continued)

(58) Field of Classification Search
None
See application file for complete search history.

(56) References Cited

U.S. PATENT DOCUMENTS 6,751,698 B1 * 6/2004 Deneroff ........... G06F 15/17343
710/317
7,694,047 B1    4/2010 Alston
(Continued)

FOREIGN PATENT DOCUMENTS

WO    2016178717 A1    11/2016

OTHER PUBLICATIONS

International Search report and Written Opinion Received, PCT/US2015/066956, dated Apr. 8, 2016, 13 pages.

*Primary Examiner* — Henry Tsai
*Assistant Examiner* — Christopher A Bartels
(74) *Attorney, Agent, or Firm* — Alliance IP, LLC

(57) ABSTRACT

Bridge logic is provided to receive a request from a device, where the request references an address of a secondary address space. The secondary address space corresponds to a subset of addresses in a configuration address space of a system, and the secondary address space corresponds to a first view of the configuration address space. The bridge logic uses a mapping table to translate the address into a corresponding address in the configuration address space, where addresses of the configuration address space correspond to a different second view of the configuration address space.

18 Claims, 10 Drawing Sheets

(51) Int. Cl.
*G06F 12/1081* (2016.01)
*G06F 12/1009* (2016.01)
*G06F 12/1027* (2016.01)

(52) U.S. Cl.
CPC .......... *G06F 13/40* (2013.01); *G06F 13/4063* (2013.01); *G06F 13/42* (2013.01); *G06F 13/4282* (2013.01); *G06F 12/1027* (2013.01); *G06F 2212/1016* (2013.01); *G06F 2212/65* (2013.01); *G06F 2213/0026* (2013.01)

(56) References Cited

U.S. PATENT DOCUMENTS

| | | | |
|---|---|---|---|
| 9,432,298 B1* | 8/2016 | Smith | H04L 49/9057 |
| 2004/0070920 A1* | 4/2004 | Flueli | G06F 9/4411 |
| | | | 361/500 |
| 2005/0080869 A1* | 4/2005 | Bender | H04L 29/06 |
| | | | 709/212 |
| 2005/0132365 A1* | 6/2005 | Madukkarumukumana | |
| | | | G06F 9/5077 |
| | | | 718/1 |
| 2007/0136458 A1 | 6/2007 | Boyd et al. | |
| 2007/0220499 A1* | 9/2007 | Bannatyne | H01R 13/665 |
| | | | 717/140 |
| 2008/0071961 A1* | 3/2008 | Higuchi | G06F 11/2017 |
| | | | 710/312 |
| 2011/0219164 A1 | 9/2011 | Suzuki et al. | |
| 2013/0117490 A1* | 5/2013 | Harriman | H04L 29/0653 |
| | | | 710/313 |
| 2014/0269881 A1* | 9/2014 | He | H04L 25/03878 |
| | | | 375/231 |
| 2014/0281069 A1 | 9/2014 | Mandapuram et al. | |
| 2014/0281641 A1* | 9/2014 | Herrera Mejia | G06F 1/24 |
| | | | 713/330 |
| 2014/0281753 A1* | 9/2014 | Wagh | G06F 13/4295 |
| | | | 714/56 |
| 2015/0006962 A1* | 1/2015 | Swanson | G06F 11/0724 |
| | | | 714/38.11 |
| 2015/0067229 A1 | 3/2015 | Connor et al. | |
| 2015/0089259 A1* | 3/2015 | Warren | G06F 1/325 |
| | | | 713/322 |
| 2015/0169036 A1* | 6/2015 | Sodhi | G06F 1/3243 |
| | | | 713/320 |
| 2015/0185809 A1* | 7/2015 | Bharadwaj | G06F 1/3253 |
| | | | 713/323 |
| 2016/0182186 A1* | 6/2016 | Adler | H04L 12/40 |
| | | | 714/776 |
| 2016/0267035 A1* | 9/2016 | Murphy | G06F 13/368 |
| 2016/0378696 A1* | 12/2016 | Warkentin | G06F 13/1694 |
| | | | 710/104 |

* cited by examiner

BUS-DEVICE-FUNCTION ADDRESS SPACE MAPPING

CROSS-REFERENCE TO RELATED APPLICATION

This Application is a national stage application under 35 U.S.C. § 371 of PCT Application PCT/US2015/066956, filed Dec. 20, 2015 and entitled "BUS-DEVICE-FUNCTION ADDRESS SPACE MAPPING", which application claims the benefit of and priority to U.S. Provisional Patent Application No. 62/158,456 filed 7 May 2015 entitled "BUS-DEVICE-FUNCTION ADDRESS SPACE MAPPING", which is incorporated herein by reference in its entirety. The disclosures of the prior applications are considered part of and are hereby incorporated by reference in their entirety in the disclosure of this application.

FIELD

This disclosure pertains to computing system, and in particular (but not exclusively) to address space mapping.

BACKGROUND

Peripheral Component Interconnect (PCI) configuration space is utilized by systems employing PCI, PCI-X, and PCI Express (PCIe) to perform configuration tasks of PCI-based devices. PCI-based devices have an address space for device configuration registers referred to as configuration space and PCI Express introduces extended configuration space for devices. Configuration space registers are typically mapped to memory mapped input/output locations by the host processor. Device drivers, operating systems, and diagnostic software access the configuration space and can read and write information to configuration space registers.

One of the improvements the PCI Local Bus had over other I/O architectures was its configuration mechanism. In addition to the normal memory-mapped and I/O port spaces, each device function on the bus has a configuration space, which is 256 bytes long, addressable by knowing the eight-bit PCI bus, five-bit device, and three-bit function numbers for the device (commonly referred to as the BDF or B/D/F, as abbreviated from bus/device/function). This allows up to 256 buses, each with up to 32 devices, each supporting eight functions. A single PCI expansion card can respond as a device and can implement at least function number zero. The first 64 bytes of configuration space are standardized; the remainder are available specification defined extensions and/or for vendor-defined purposes.

In order to allow more parts of configuration space to be standardized without conflicting with existing uses, there can be a list of capabilities defined within the first 192 bytes of Peripheral Component Interface configuration space. Each capability has one byte that describes which capability it is, and one byte to point to the next capability. The number of additional bytes depends on the capability ID. If capabilities are being used, a bit in the Status register is set, and a pointer to the first in a linked list of capabilities is provided. Previous versions of PCIe have been provided with similar features, such as a PCIe extended capabilities structure.

DETAILED DESCRIPTION

Figure 1:
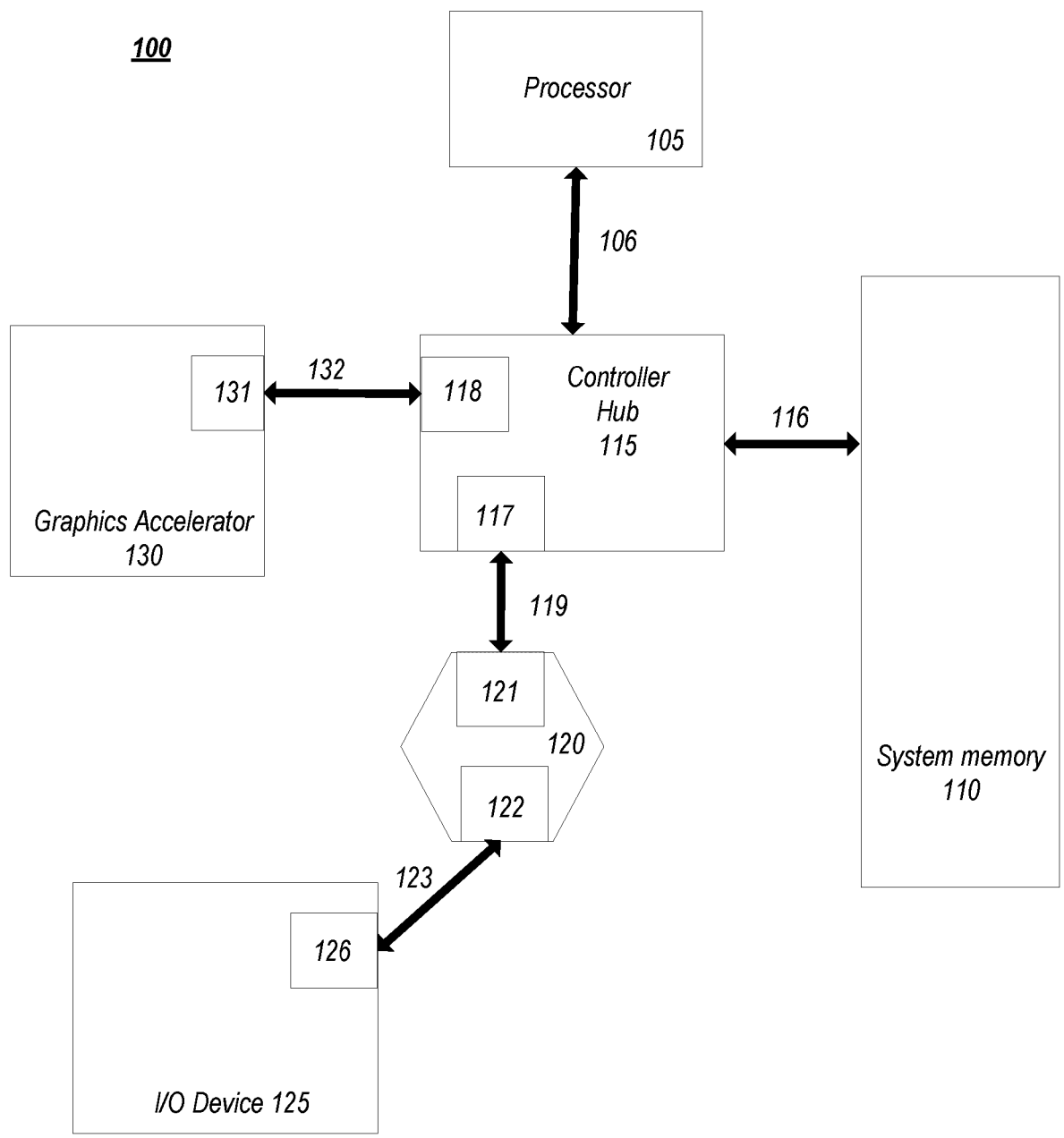
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus, methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
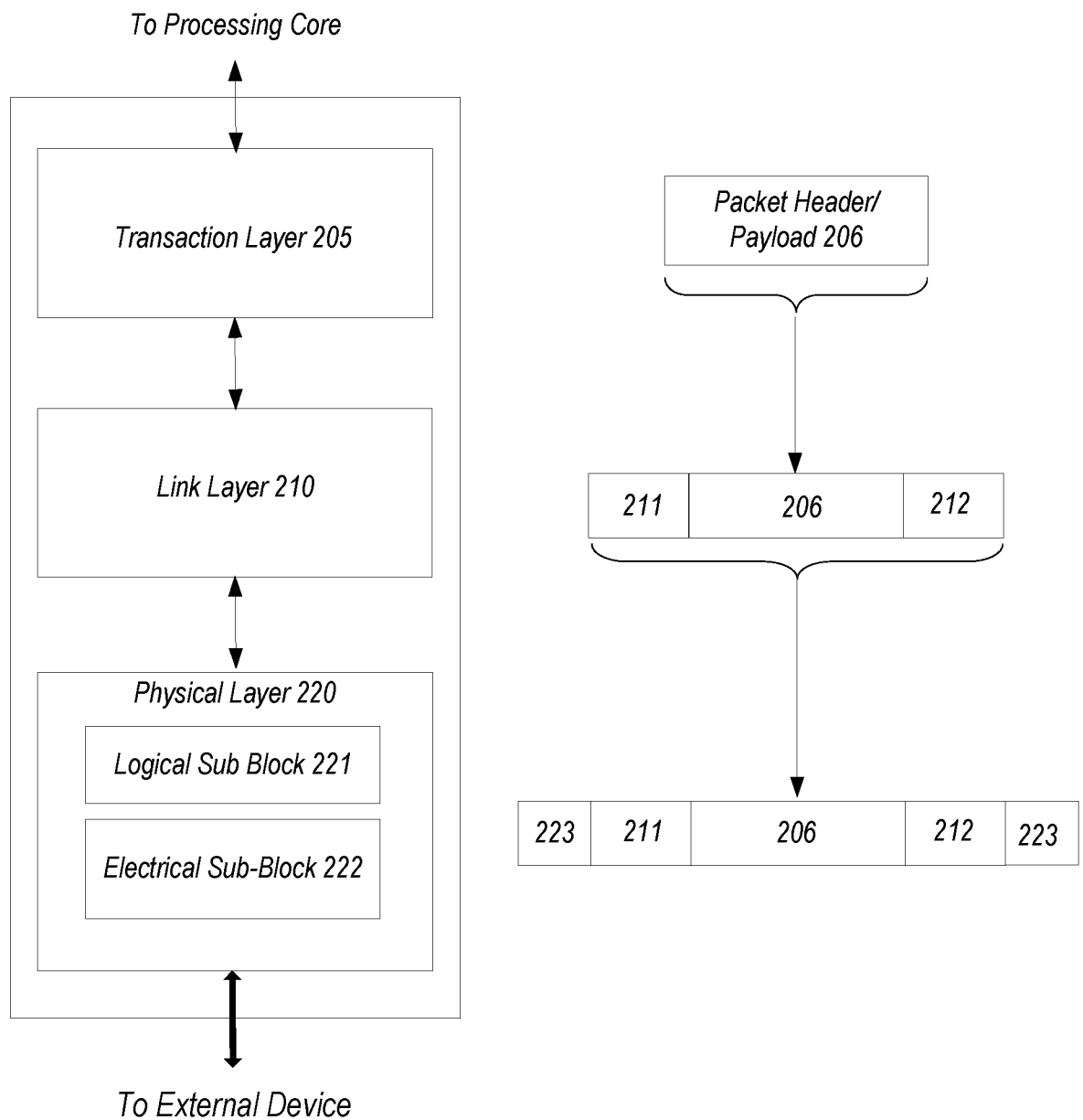
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
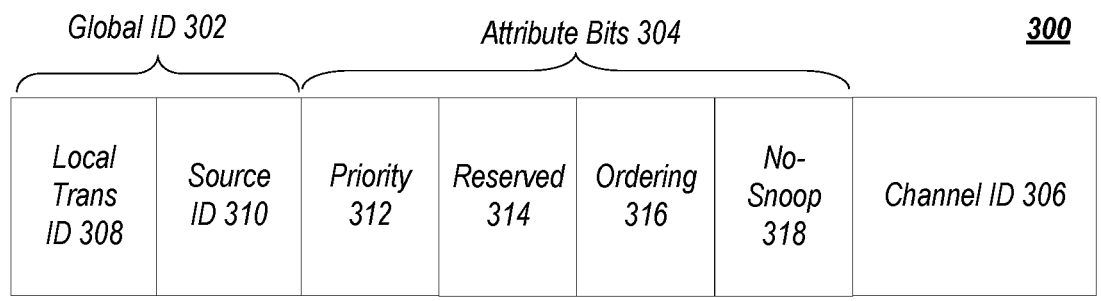
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
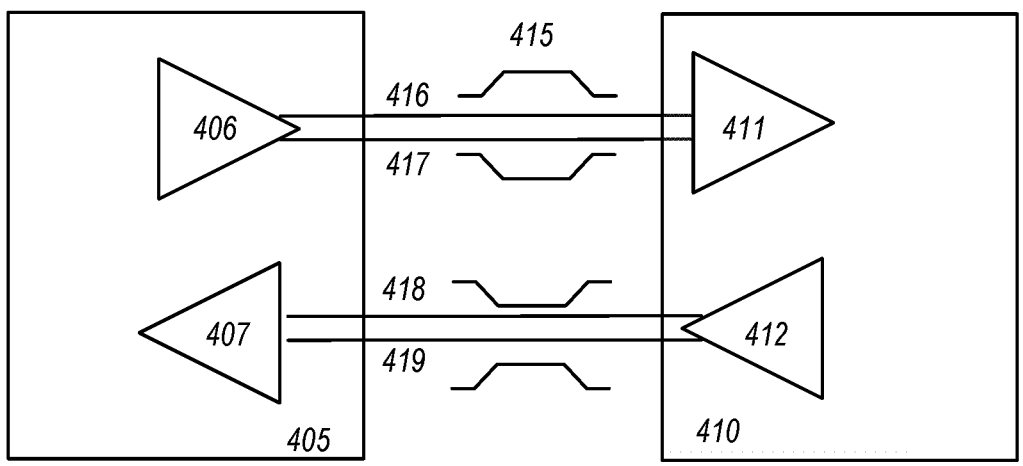
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

New and growing use models, such as PCIe-based storage arrays and Thunderbolt, are driving a significant increase in PCIe hierarchy depth and width. The PCI Express (PCIe) architecture was based on PCI, which defines a "Configuration Space" in which system firmware and/or software discover Functions and enable/disable/control them. The addressing within this space is based on a 16 bit address (commonly referred to as the "BDF", or bus-device-function number) consisting of an 8 bit Bus Number, a 5 bit Device Number, and a 3 bit Function Number.

Figure 5:
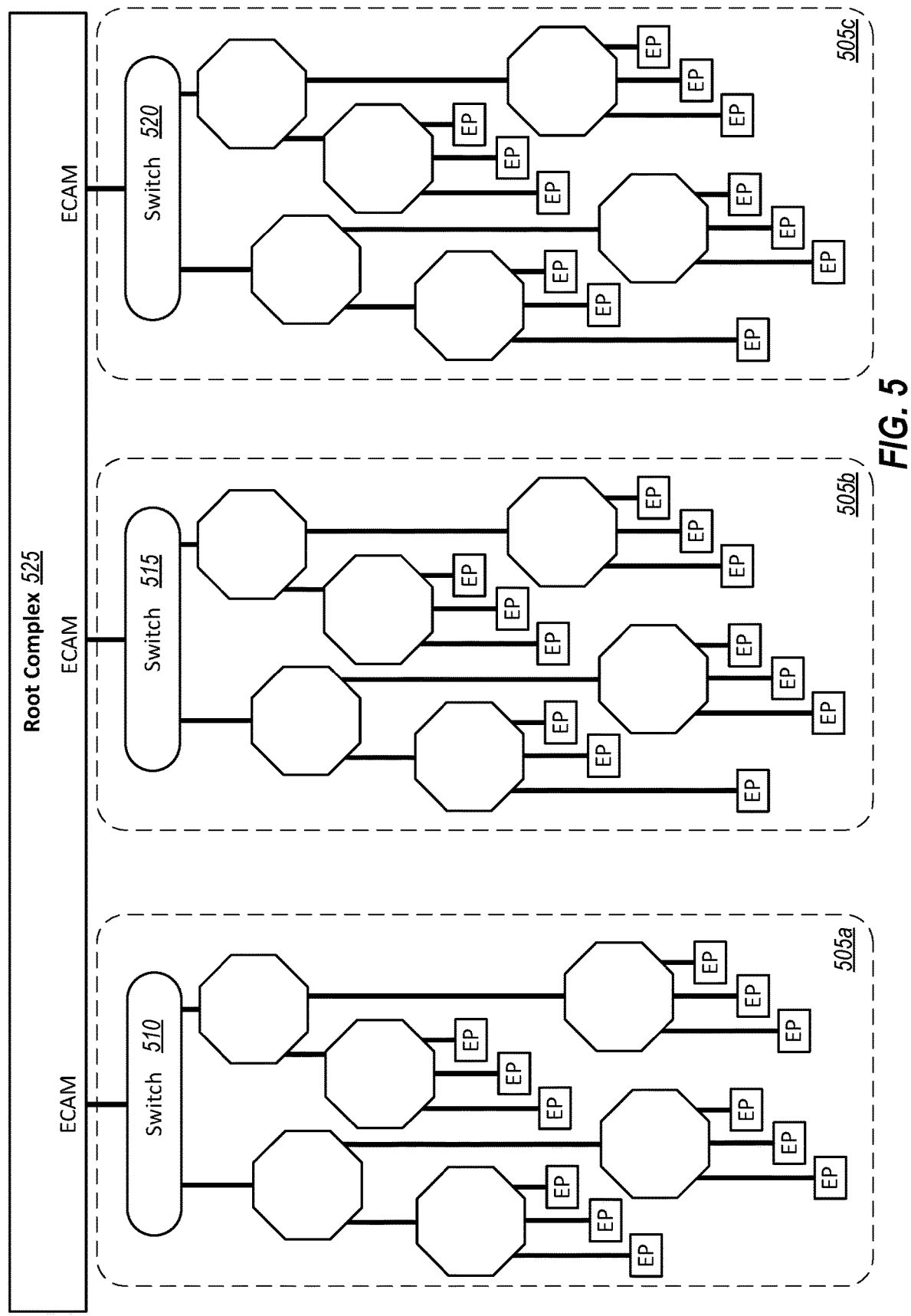
FIG. 5 illustrates a representation of system buses.

PCI allows systems to provide for multiple, independent BDF spaces, which are called "Segments". Each Segment may have certain resource requirements, such as a mechanism for generating PCI/PCIe Configuration Requests, including the Enhanced Configuration Access Mechanism (ECAM) defined in the PCIe specification. Additionally, input/output (I/O) memory management units (IOMMUs) (such as Intel VT-d) can use BDF space as an index, but may not be configured to directly comprehend Segments. Accordingly, in some instances, a separate ECAM and IOMMU must be duplicated for each Segment defined in a system. FIG. 5 illustrates an example of a system including multiple segments (e.g., 505a-c). For instance, a Segment, in this example, is defined for each one of three switches 510, 515, 520 that connect to a Root Complex 525. A separate IOMMU and ECAM (e.g., 530a-c) can be implemented at the Root Complex 525 to facilitate each of the Segments (e.g., 505a-c). Further, in this example, a variety of endpoints (EP) are connected to various buses in each Segment. In some cases, configuration space of a Segment may reserve multiple bus addresses for potential hot plug events, limiting the total number of bus addresses that are available within each Segment. Still further, allocation of bus numbers in one or more of the Segments may be according to an algorithm that concerns itself little with densely populating the addresses and making compact use of the available bus address space. This can result in wasted configuration address (i.e., BDF) space in some instances.

Traditional PCIe systems are configured to assign address space in a manner that, when applied to modern and emerging use cases, tends to make inefficient use of BDF space and of Bus Numbers in particular. While relatively few implementations may actually involve a single system consuming all 64K of unique BDF values (e.g., defined under PCIe), deep hierarchies such as those that occur, for example, in deep hierarchies of PCIe Switches, may use up available Bus Numbers very quickly. Additionally, in applications supporting hot plugging, large portions of the BDF space may be typically reserved for future potential use (i.e., when a future device is hot plugged to the system), taking additional swaths of Bus Numbers from the pool immediately usable by a system. While Segment mechanisms can be applied to address this issue, Segments themselves have poor scaling because, as noted above, additional hardware resources (e.g., IOMMUs) are to be built into the CPU, platform controller hub (PCH), system on chip (SoC), root complex, etc., in order to support each segment. Thus using Segments to address deep hierarchies results in scaling the system to satisfy a worst case system requirement, which is typically much more than what would be needed for most systems, resulting in significant waste of platform resources. Further, Segments can be difficult (and, in some cases, essentially impossible) to create outside of a root complex of the system.

Figure 6:
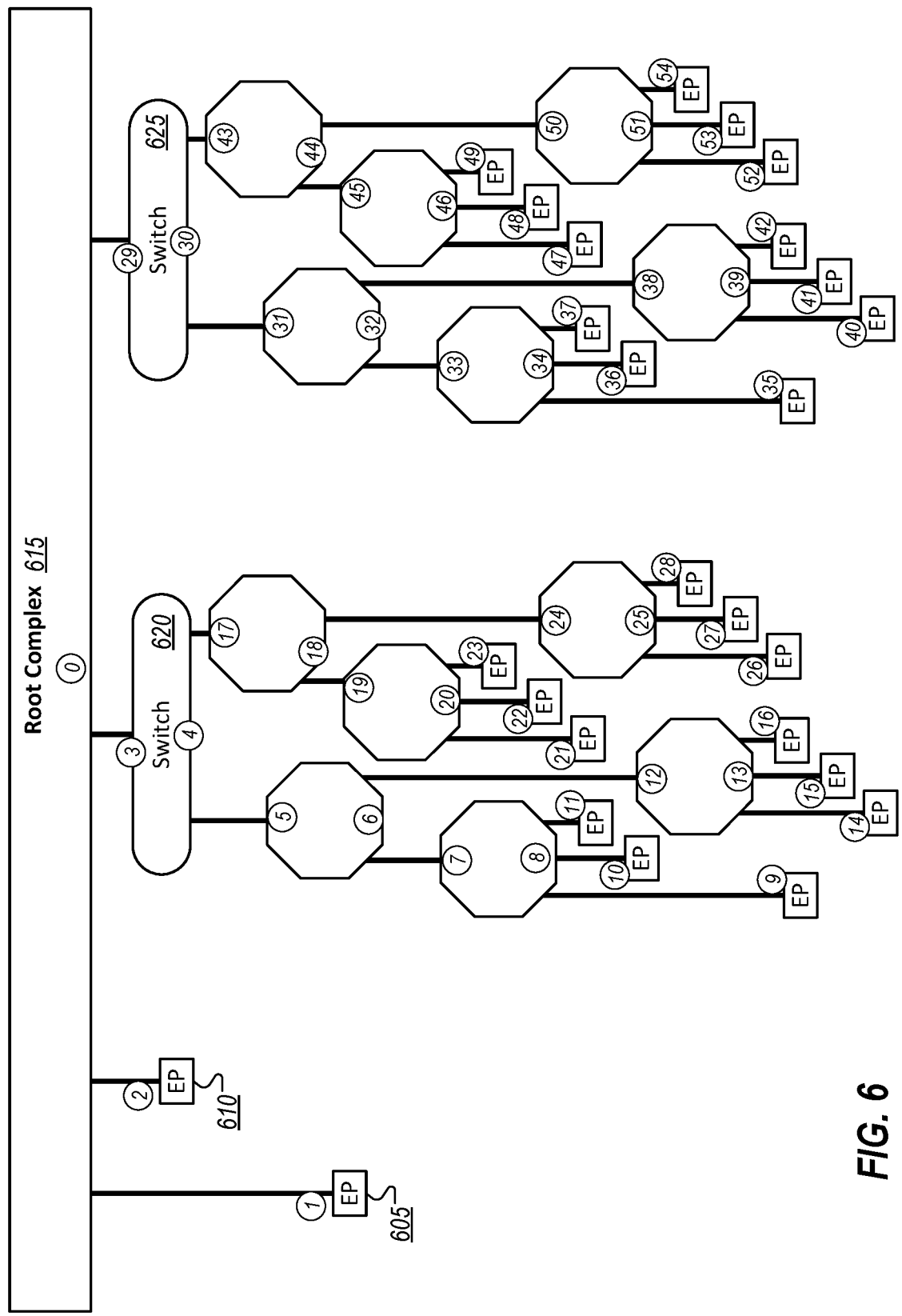
FIG. 6 illustrates a representation of enumeration of bus identifiers in a system.

In some implementations, a system can be provided to enable more efficient use of BDF space and address at least some of the example issues above. This can allow for the expansion of PCIe, Thunderbolt, system on chip fabrics (e.g., Intel On-Chip System Fabric (IOSF) and others), and other interconnects to very large topologies, but without requiring dedicated resources in the Root Complex, as would be the case in solutions relying exclusively on Segments or other alternatives. FIG. 6 illustrates an example assignment of bus numbers to buses within the system according to an example PCIe BDF assignment. In this example, a system with two directly connected devices 605, 610 directly connected to a Root Complex 615 and two Switch-based hierarchies (corresponding to switches 620, 625) are enumerated with approximately the densest possible Bus Number allocations (as designated by circle labels (e.g., 650a-d, etc.). In deep hierarchies, the available bus numbers in a single BDF space can be quickly consumed. Further, real world systems typically allocate bus numbers far less efficiently, resulting in sparse (or "wasted") allocation of the BDF space.

Another problem with use cases that support hot add/remove such as Thunderbolt and, in some cases, PCIe-based storage, is that the Bus Number assignments in BDF space are "rebalanced" to address hardware topology changes occurring in a running system. Rebalancing, however, can be very difficult for system software to do because, in typical cases, all PCI Functions are then forced into a quiescent state in connection with the rebalancing in order to allow the BDF space to be re-enumerated by the system, followed by the re-enabling of the PCI Functions. This process can be quite slow, however, and typically results in the system freezing for what can, in the worst case, be very long periods of time (e.g., long enough to be disruptive to running applications, and easily visible to the end user). An improved system can also be provided to shorten the time it takes to apply a revised BDF space such that the rebalancing process can be performed in a span of hundredths of milliseconds or quicker and without explicitly placing PCI Functions into quiescent states.

Finally, very large systems or systems with (proprietary) mechanisms for supporting multiple Root Complexes, may be defined to require the use of Segments. An improved system can also be applied within such use cases to provide for the management of devices with a minimum of change relative to what would be implemented using a single-Root system. Specifically, an improved system can provide a mapping portal bridge (MPB) implemented using hardware (and/or software) logic of one or more devices in a system to provides multiple views of a BDF space and remapping tables to enable a "bridge" (which is the logical view of a Root or Switch Port) to translate one view of a BDF space into another, in both directions across the bridge, to effectively create a virtual Segment.

A mapping portal bridge (MPB) can be provided at a port of a root hub or switch to enable translation between primary and secondary BDF spaces, in some implementations. An MPB can be implemented in Root Ports and/or Switch Ports, with a consistent software model, and can be implemented recursively within a given topology, allowing high degree of scalability. Further, a MPB need not be tied to a particular use model (e.g., it can be alternatively used in either or both Thunderbolt (TBT) and regular PCIe use cases). Additionally, MPB implementations can support implementation flexibility and engineering price/performance tradeoffs. Further, consistency in an existing PCIe system software stack can be maintained, among other example advantages.

The MPB utilizes a mapping mechanism that allows the MPB to map all PCIe Packets flowing across the MPB between a BDF primary space and a BDF secondary space. The BDF primary space refers to the view of the Configuration Address space seen on the primary side of the bridge (i.e., the side closer to the host CPU (e.g., at the root complex)). The BDF secondary space can refer to the view of the Configuration Address space created and managed for devices on the secondary side of the bridge (i.e., the side closer to the devices). In PCIe, the same BDF assignments used for device configuration may also be used to identify the source (and sometimes destination) of packets, report errors, and to perform other functions.

Figure 7:
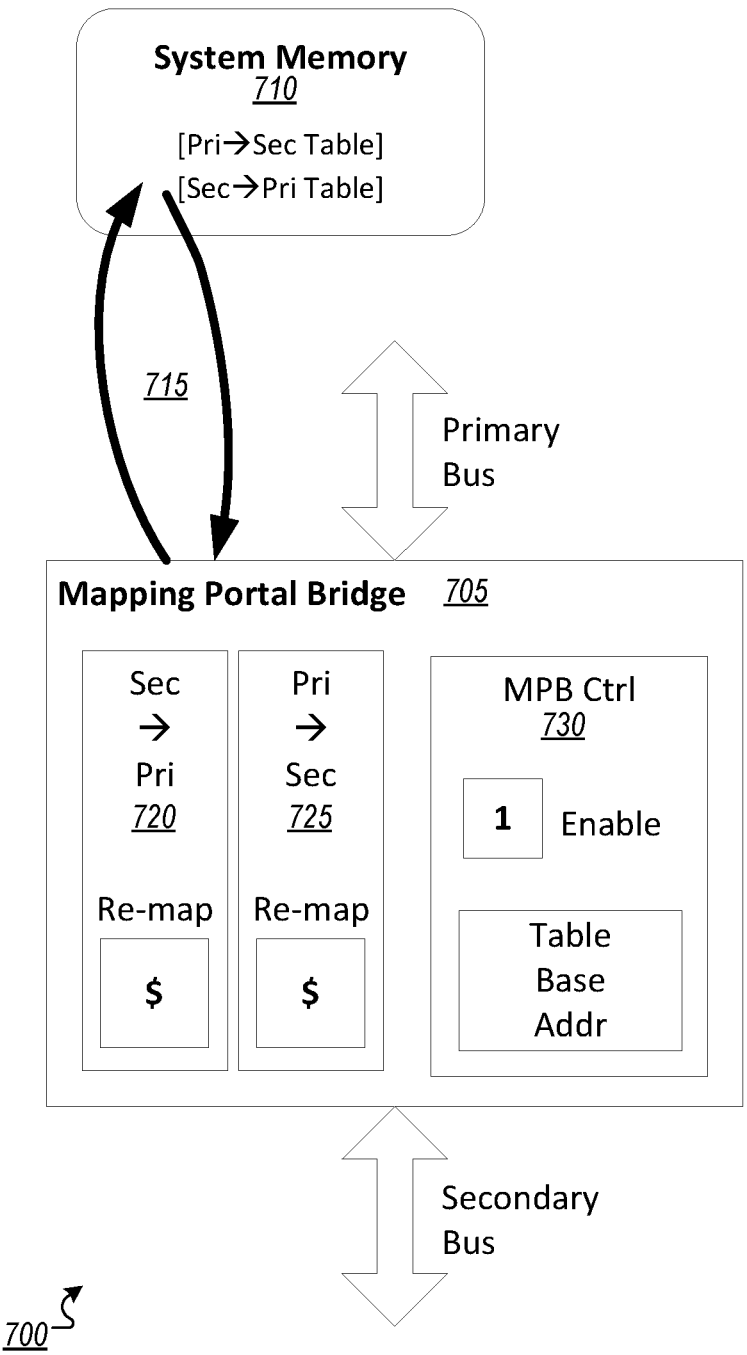
FIG. 7 illustrates an embodiment of a mapping portal bridge (MPB).

FIG. 7 illustrates a block diagram 700 representing an example implementation of an MPB 705. The MPB 705 can include a pointer to and/or a (full or partial) local copy of two mapping tables, one for secondary address space to primary address space mapping (BDFsec→BDFpri) and another for primary address space to secondary address space mapping (BDFpri→BDFsec). The mapping tables, in one example, can be stored in system memory 710, in which case the MPB 705 can read the tables from system memory (at 715) and/or maintain local copies (720, 725) of at least a portion of each mapping table (i.e., BDFsec→BDFpri and BDFpri→BDFsec) (e.g., to enhance performance). In still other examples, the BDFsec→BDFpri and BDFpri→BDFsec mapping tables can be stored directly in the MPB 705 without maintaining copies in system memory 710. The MPB 705 can further perform and manage translations between the primary BDF space and one or more BDFsec spaces. In the case of multiple BDFsec spaces, a single mapping table can be used that includes a column to map not only the BDFsec address but also the particular one of the BDFsec spaces to a BDFpri address. In other cases, separate mapping tables can be maintained for each BDFsec space. The MPB can be implemented in hardware of a switch, hub, or port, such as a port of a root complex. The MPB 705 can also include control logic 730 to enable/disable the mapping functionality (e.g., to selectively configure MPB 705 as an option on various ports of a switch or root complex, among other examples).

An MPB 705, in some instances, can be configured to flexibly operate as either an MPB 705 (utilizing the primary/secondary BDF space mapping mechanism) or a conventional bridge (e.g., utilizing traditional PCIe BDF addressing) (e.g., using control logic 730). When system software intends to enable an MPB 705, it can configure the MPB to provide a unique one-to-one mapping between Primary (BDFpri) and Secondary (BDFsec) BDF addresses. In other words, a single primary side BDF can correspond to a single secondary side BDF. Among other example advantages, this constraint can ensure that the MPB does not track outstanding requests, as such tracking would add significant cost to the MPB. In some implementations, multiple MPBs can be deployed in a system. For instance, a separate MPB 705 can be provided for each BDFsec space. In such cases, the BDFsec assignments behind these multiple different MPBs can be permitted to (and likely will) reuse the same BDF values (in their respective second BDF spaces), provided these are mapped to unique values in the BDFpri space.

System software can enumerate BDFsec space according to any suitable or customary algorithm. In some cases, before a specific BDF on the secondary side can be initially probed, the enumerator configures the MPB to assign a "key" in BDFpri. This key can be used to generate and remap the Configuration Requests to that specific BDF. The enumerator must "understand" the BDFpri:BDFsec mapping during this initial enumeration, and can provide services to all modules using the BDF to perform this mapping during system operation.

Figure 8:
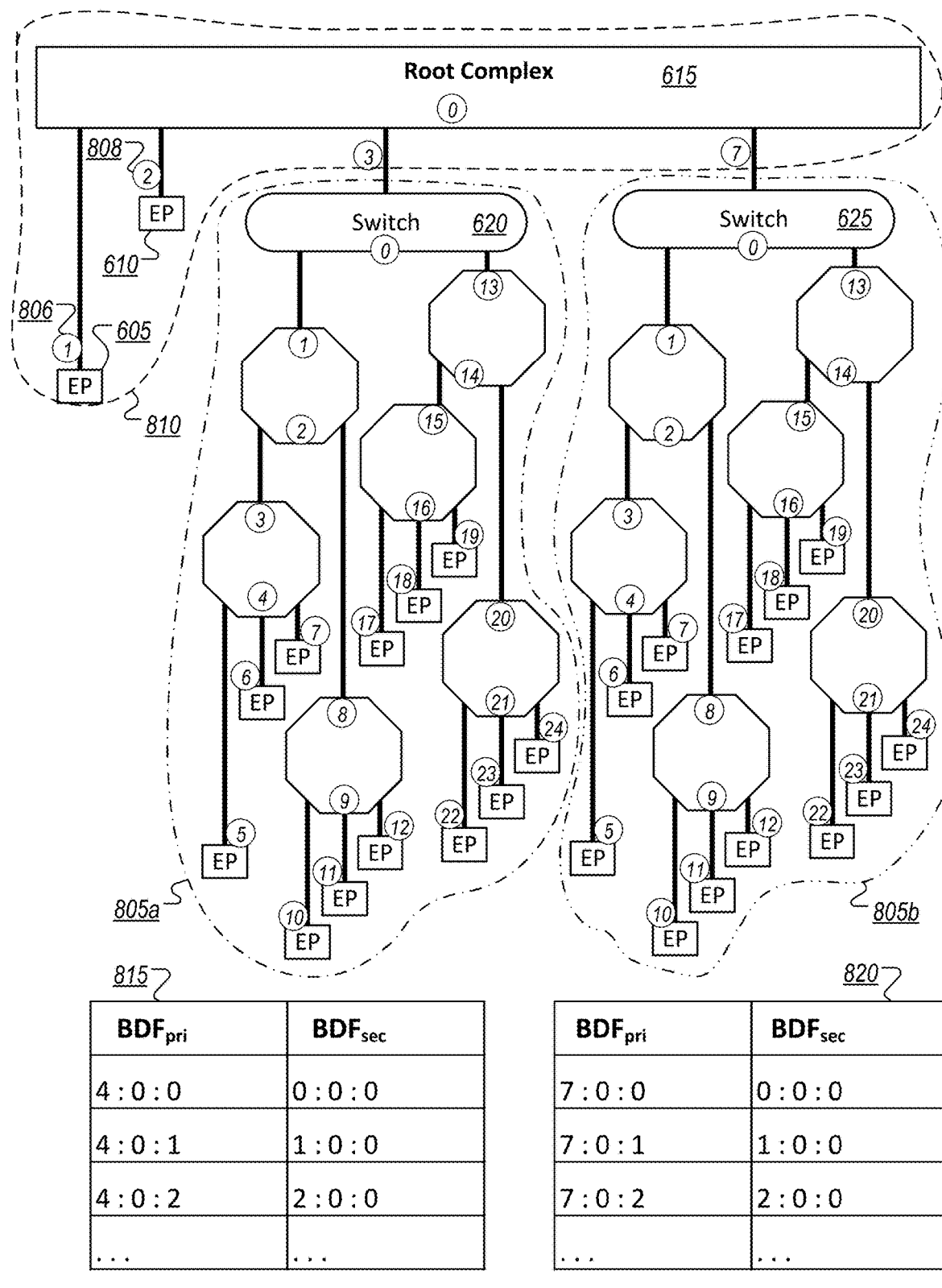
FIG. 8 illustrates a representation of enumeration of bus identifiers in a system and corresponding address mappings.

FIG. 8 is a simplified block diagram showing the example of FIG. 6 modified through the use of MPB(s) enabling a BDFpri space/BDFsec space dichotomy. For instance, FIG. 8 shows, how the BDFsec spaces may be assigned in a system with two MPB's (a first MPB used to implement virtual segment (vSEG) A (805*a*) and a second MPB used to implement vSEG B (805*b*). In this example, Bus Numbers 1 and 2 (at 806, 808) of the Root Complex 625 can be maintained in BDFpri space (810) and assigned to the two directly connected devices 605, 610. Hierarchies of connections from busses 3-*n*, in this example, can be dealt with through BDF sec spaces (corresponding to vSEG A (805*a*) and vSEG B (805*b*)) and one or more corresponding MPBs. For instance, busses 3-6 can be enumerated toward a BDFsec space vSEG A (805*a*), thereby providing a virtual segment to the buses and devices connecting to the root complex through busses 3-6. A second virtual segment can be provided by defining a second BDFsec space vSEG B (805*b*) incorporating buses and devices connecting to the root complex through busses 7-*n*. Each BDFsec space can be allocated BDF addresses (and bus numbering) within the respective second space according to any suitable scheme, including schemes that allocate these addresses inefficiently. Indeed, different BDFsec spaces can allocate addresses differently based on the types of endpoints or routing devices connected to the corresponding busses. Unlike the BDFsec spaces, the BDFpri space (i.e., the view of the configuration space enjoyed by the root complex), can be optimized to allow for and control compact and efficient allocation of bus addresses within the space (e.g., as illustrated in the example of FIG. 6).

Each BDFsec address in each of vSEG A and vSEG B can map to exactly one BDF address is BDFpri space (e.g., according to mappings 815, 820). As an example, a first device within the vSEG A can be assigned BDF "1:0:0" within the vSEG A BDFsec space, which is mapped to primary BDF "4:0:0" (as shown in mapping 815), among other examples. Different devices in other BDFsec spaces of the system (e.g., vSEG B), can assign the same BDFsec values as assigned in other BDFsec spaces (e.g., vSEG A). For instance, a second device, within vSEG B, can also be assigned BDF "1:0:0", but within the BDFsec of vSEG B. The second device, however, will be mapped to a different BDF within the BDFpri of the system (i.e., BDF "7:0:1", as shown in mapping 820), and so on.

As noted above, in some implementations, the mapping(s) between BDFpri and BDFsec spaces can be accomplished through mapping tables based in system memory. Different packet types may be mapped (i.e., to pass between BDFsec and BDFpri spaces) differently. For instance, for Requests in both directions, the corresponding Requester ID can be remapped (e.g., according to the appropriate mapping table). Configuration & ID Routed Message Requests can be routed by ID Bus/Device/Function Number fields. Completions in both directions can be routed by Requester and Completer IDs, among other examples.

The mapping hardware of the MPB can access mapping tables located in system memory, with optional caching in the MPB. In some implementations, a single mapping table can be used for traffic in both directions, with the MPB possessing logic to determine mapping in the forward (e.g., downstream) and the reverse (e.g., upstream) (e.g., through reverse look-up operations) directions. In other implementations, it can be more efficient to provide two separate mapping tables per MPB, one for the forward direction and the other for the reverse direction. This can be less expensive than providing MPB hardware to perform a reverse-lookup in one of the two directions in some instances.

An MPB, at the primary side (e.g., the port closest to the Root Complex), can be responsible for mapping a subset of the bus numbers of BDFpri space to a corresponding BDFsec space. Accordingly, the range of Bus Numbers in BDFpri space assigned to the MPB may be limited to the range indicated by [Secondary Bus Number to Subordinate Bus Number], because in the BDFpri space only packets in that range will ever be directed to that respective MPB. Thus the table for mapping BDFsec:BDFpri may involve a translation table large enough to cover the Secondary to Subordinate range of Bus Numbers, but not necessarily larger. In some embodiments, a default 64K entry table can be provided for simplicity in implementation. Indeed, for mapping BDFpri to BDFsec, a 64K entry translation table can be provided to make the full BDF space available on the secondary side, but this can be constrained in some alternatives to reduce hardware/memory requirements.

Mapping tables can be maintained by system software governing data communication in PCIe (or other interconnects implementing these features). For instance, in implementations utilizing two separate upstream and downstream tables, the two tables may be maintained by system software. The system software can ensure consistency between the tables such that a mapping of BDFx→BDFy→BDFx' always gives the result that x=x', among other example considerations.

In some implementations, an MPB can implement a cache to store at least a portion of the mapping tables locally at the MPB. System software can assume that MPBs cache translations based on the mapping tables and can support cache management by providing the necessary cache management information to the hardware. It may be desirable to provide mechanisms for system software to ensure that the MPB cache is updated only under system software control. Further, a mechanism can be defined, such as a specific register (s) in MPB memory-mapped I/O (MMIO) space, to provide pointers to the mapping tables in system memory. Registers can also be used for cache management, for system software to enable/disable caching, invalidating the MPB cache, etc. Alternately, in some implementations, the tables can be implemented directly in the MPB without maintaining copies in system memory. In this case system software directly updates the tables at the MPB as required.

An additional benefit of the MPB mapping table mechanism is that system software can update the mapping tables atomically, for instance, by creating new mapping tables and then "instantly" invaliding the MPB cache and redirecting the MPB from the old to the new tables. This can be done by defining the control register mechanism such that the MPB hardware is required to sample the register settings when indicated to do so by system software, and then continue operating with the sampled settings until instructed to re-sample. This re-sampling can be performed by MPB hardware in such a way that the transition from the old to the new sample takes effect atomically. By also providing a mechanism for system software to temporarily block traffic through the MPB (e.g., to "pause" traffic at the MPB to allow for changes to the mapping tables), it becomes much more attractive to allow system software to modify the bus number assignments ("rebalance") in a running system, because the amount of time it takes to switch over the mapping tables can be kept quite short. Alternately, if the mapping tables are maintained directly in the MPB, a mechanism can be employed such as double-buffering which enables the MPB to operate using one copy of the tables while an alternate set is updated by system software, and then under system software direction, the MPB transitions to operating with the updated tables (e.g., while local tables are replaced with the updated versions).

Figure 9:
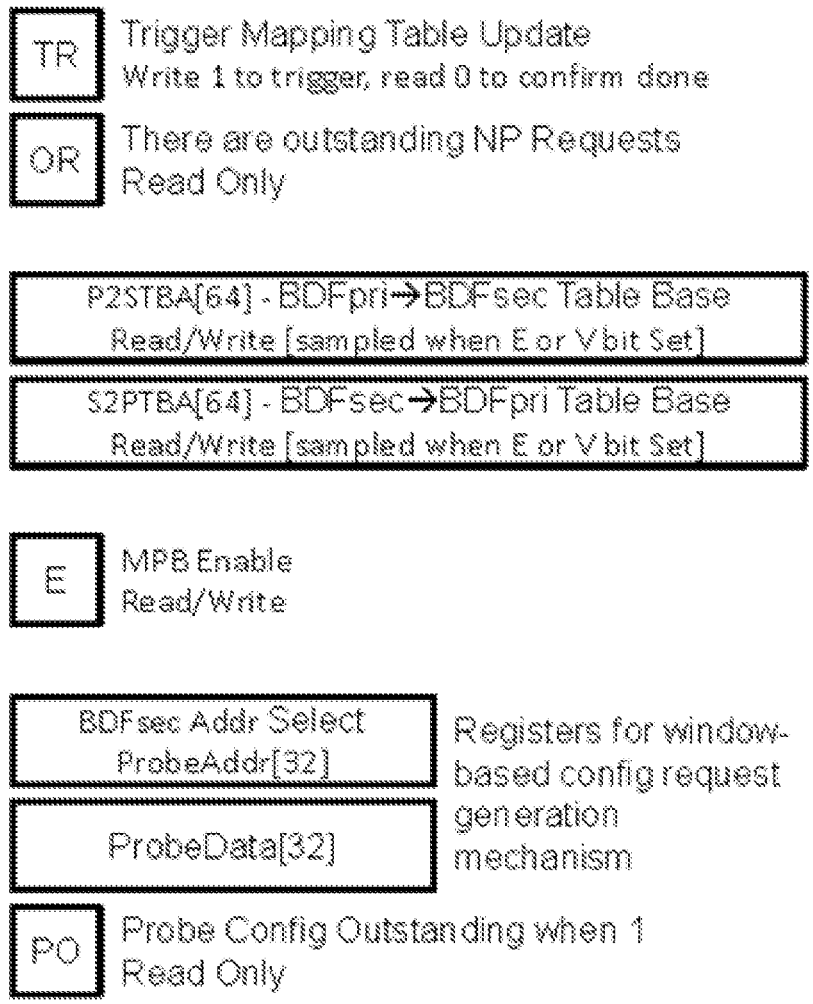
FIG. 9 illustrates a representation of at least a portion of an example capability register.

Turning to FIG. 9, a representation is shown of an example embodiment of the register fields and bits for use in implementing the hardware/software interface for an example MPB. Specifically, in this particular example, a PCIe Extended Capability can be defined for discovery/management in an MPB system. The extended capability can include fields such as: an Outstanding Requests (OR) field reflecting MPB count of non-posted (NP) requests in either direction (although the non-posted requests would not be specifically or individually tracked); an MPB enable (E) bit to indicate whether MPB functionality is enabled at a bridge supporting MPB (where address registers are to be sampled by MPB when E bit Set (0→1)); and a mapping table update trigger field (TR), among other examples. In some cases, additional fields can be used in connection with a window mechanism for generating "probe" configRequests behind MPB, such as a status bit so system software can comprehend when ConfigWrites complete. In some cases, the window mechanism may only support one ConfigRequest at a time (e.g., no pipelined requests). In still other examples, the capability structure can provide values to describe the nature of local translation tables maintained at an MPB (e.g., to indicate the size of the table if not full size, etc.), among other examples.

BDF primary/secondary mapping and MPBs can be used in conjunction with Segments in some implementations. As noted above, MPBs can be used to implement Virtual Segments (vSEGs) to at least partially replace and reduce the number of Segments in a system design. In cases where Segments are to be included, or when a multi-root system is created (e.g., using a proprietary load/store fabric), MPBs can be extended to support mapping between different Segments and between parts of a hierarchy that do not support Segments. For example, in a system where the BDFpri is augmented to support Segments, this in effect becomes a Segment's BDFpri (SBDFpri) space, because the Segment acts as a "prefix" to increase the number of Bus Numbers available. In such a system a mechanism such as a TLP Prefix could be used to identify specific Segments. However since many devices do not yet support a Segment tagging mechanism, the MPB mapping mechanism, with extensions, can be used to support mapping a BDFsec space that does not support Segment tagging into an SBDFpri space that does support Segment tagging, among other examples.

Probing can be accommodated by MPBs in some implementations. Here, "probing" can refer to reading the first data word (DW) of a function's configuration space to see if there is a valid Vendor/DeviceID. Using the in-memory tables during probing, however, can involve repeated updates, which has the potentially of being particularly problematic if probing is done during runtime due to repeated updating of the mapping tables that may take place. To avoid this, a mechanism can be provided to generate configuration requests through the MPB for probing. This mechanism may not be intended for use as the normal configuration generation path, but may instead be configured for probing (and some instances also as a "failsafe"). In one example, the mechanism can include a windowing mechanism in the Extended MPB Capability (e.g., based on the CFC/CF8 configuration access mechanism defined for PCI, extended with support for 4K configuration space). System software can use this mechanism to discover a Function, for example, by probing. Upon discovery of a function, system software can then update the mapping tables to provide translation for the Function, and proceed with further enumeration/configuration through the table-based translation mechanism of the MPB, among other examples features.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 10:
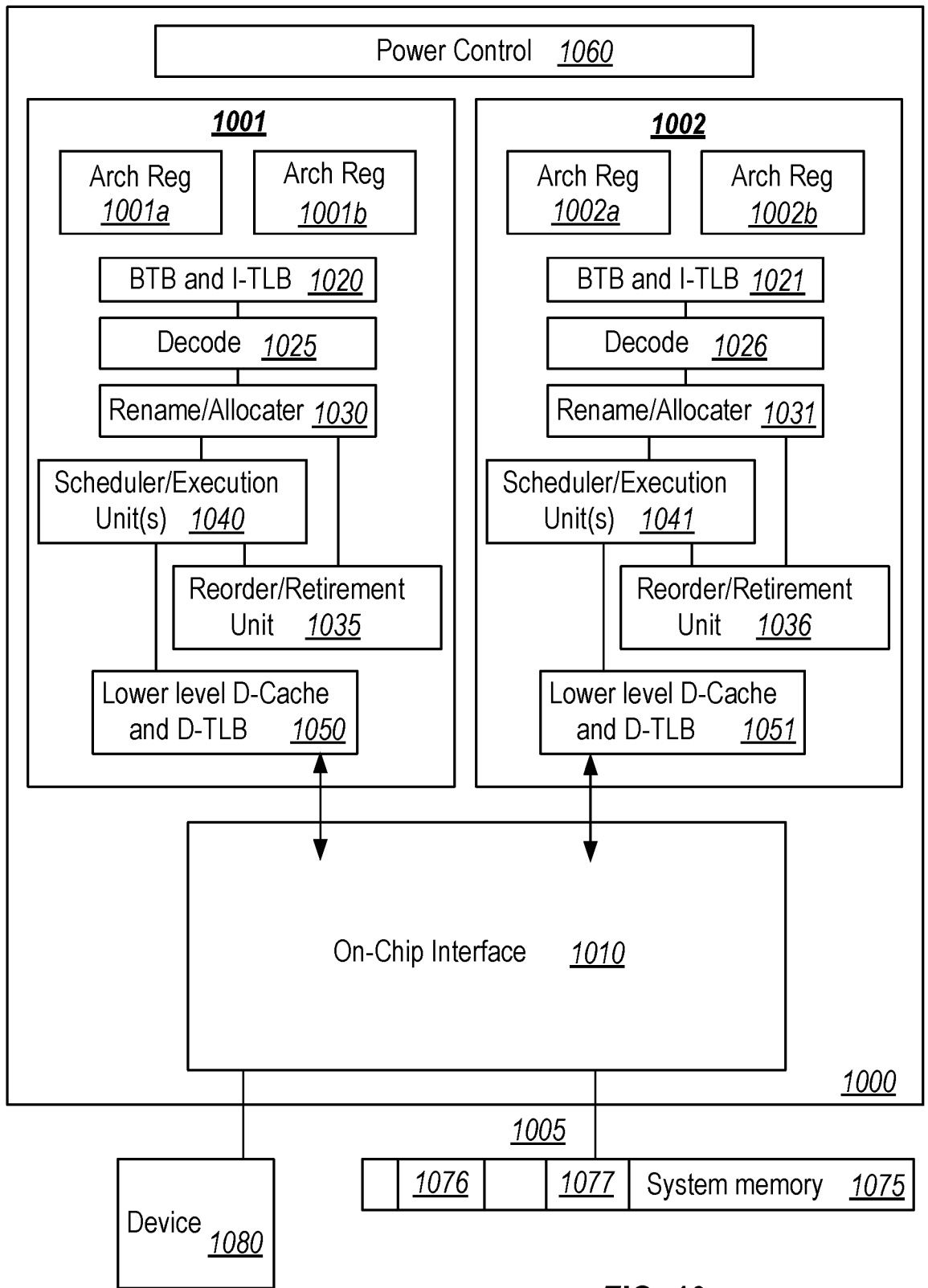
FIG. 10 illustrates an embodiment of a block diagram for a computing system including a multicore processor.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-c ache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
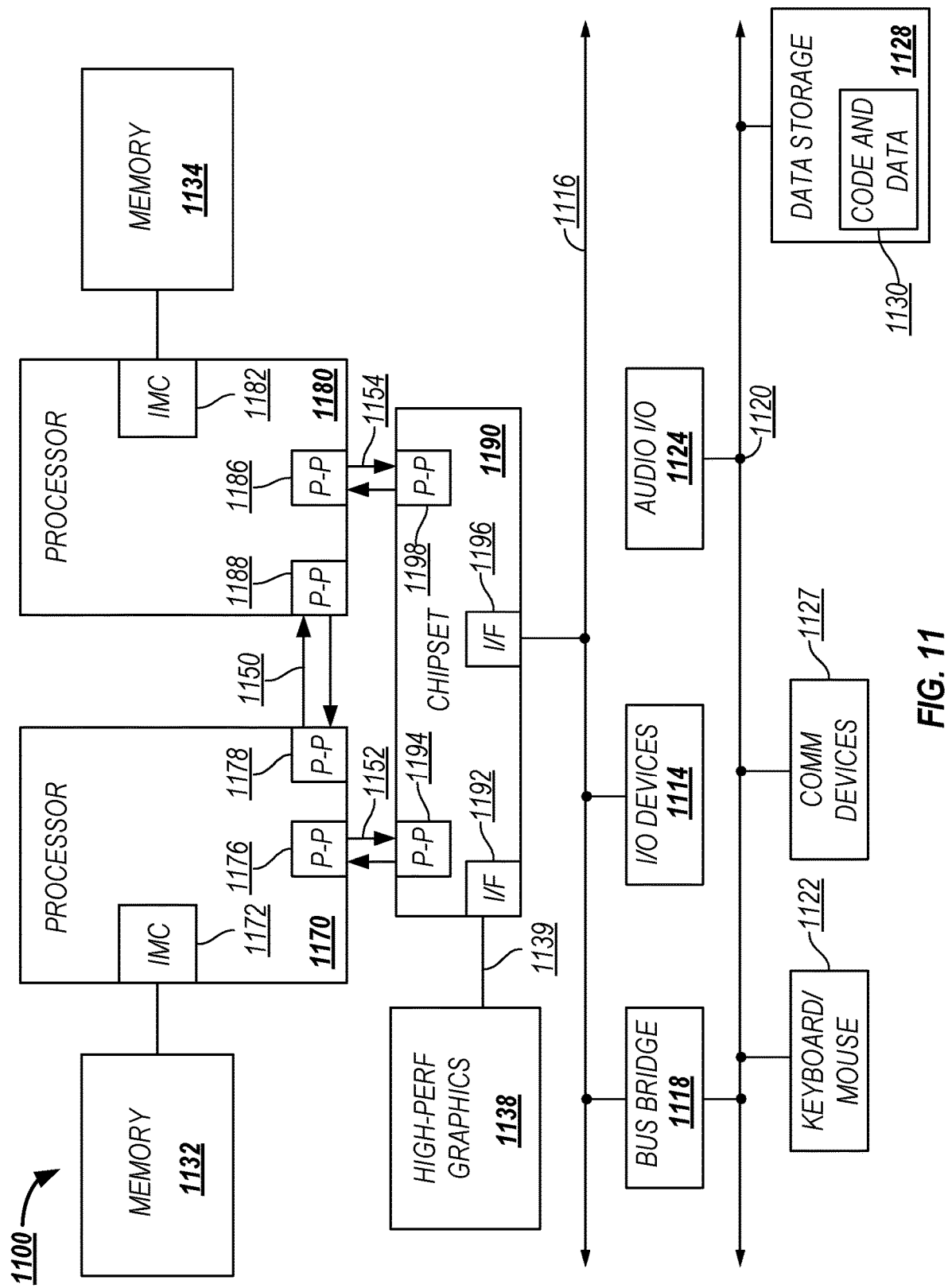
FIG. 11 illustrates another embodiment of a block diagram for a computing system.

Referring now to FIG. 11, shown is a block diagram of a second system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as Intel's Quick Path Interconnect (QPI) architecture. As a result, the invention may be implemented within the QPI architecture.

While shown with only two processors 1170, 1180, it is to be understood that the scope of the present invention is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

The following examples pertain to embodiments in accordance with this Specification. One or more embodiments may provide a method, a system, a machine readable storage medium, and an apparatus including bridge logic to receive a request from a device, where the request references an address of a secondary address space, the secondary address space corresponds to a subset of addresses in a configuration address space of a system, and the secondary address space corresponds to a first view of the configuration address space. The bridge logic can further use a mapping table to translate the address into a corresponding address in the configuration address space, where addresses of the configuration address space correspond to a different second view of the configuration address space.

In one example, the second view of the configuration address space includes a view of a root complex of the configuration address space.

In one example, the first view of the configuration address space includes a view of the device of the configuration address space.

In one example, the second address space includes a particular one of a plurality of non-overlapping secondary address spaces each mapping to a corresponding portion of the configuration address space.

In one example, a particular address is included in two or more of the plurality of secondary address spaces.

In one example, the configuration address space includes a Peripheral Component Interconnect (PCI)-based configuration address space.

In one example, an address within the configuration address space includes a respective one of a set of bus/device/function numbers.

In one example, each address in the secondary address space maps to exactly one respective address in the configuration address space.

In one example, the configuration address space further includes a subset of addresses reserved for hot-plugging.

In one example, addresses in the configuration address space are enumerated to maximize utilization of available bus addresses within the configuration address space.

In one example, addresses in the configuration address space are enumerated according to a first technique and addresses in the secondary address space are enumerated using a different second technique.

In one example, the second technique is agnostic to maximizing available bus addresses within the secondary address space.

In one example, the mapping table includes two mapping tables, one for upstream translations, the second for downstream translations.

In one example, the mapping table is stored in system memory, a pointer in local memory points to the mapping table, and the bridge logic access the mapping table using the pointer.

In one example, memory can be provided (e.g., at the apparatus) to store at least a portion of the mapping table locally for access by the bridge logic.

In one example, the bridge logic is further to identify an update to the mapping table, invalidate a local copy of at least a portion of the mapping table, and replace the local copy with a new copy of at least a portion of the updated mapping table.

One or more embodiments may provide a method, a system, apparatus, and a machine readable storage medium storing instructions executable to manage mapping tables for access by a mapping portal bridge to translate configuration address space addresses between a primary address domain and a secondary address domain for a system. The primary address domain can include a view of the configuration address space as viewed upstream from the mapping portal bridge and the secondary address domain can be a view of the configuration address space as viewed downstream from the mapping portal bridge. Changes to the system can be detected and the mapping tables updated based on the change.

In one example, mapping tables can be accessed by a different second mapping portal bridge, and mapping tables for the second mapping portal bridge can define a mapping between the primary address domain and a second secondary address domain.

In one example, the first secondary address domain corresponds to a first virtual Peripheral Component Interconnect Express (PCIe) segment and the second secondary address domain corresponds to a second virtual PCIe segment.

In one example, a read request is received from the mapping portal bridge for a particular request, and a response to the read request can be returned to the mapping portal bridge.

One or more embodiments may provide a system including a root complex and a mapping portal bridge coupled to a device and receiving data exchanged between the device and the root complex. The mapping portal bridge can receive a request from a device that references an address of a secondary address space corresponding to a subset of addresses in a configuration address space of a system and corresponding to a first view of the configuration address space. The mapping portal bridge can use a mapping table to translate the address into a corresponding address in the configuration address space, where addresses of the configuration address space correspond to a different second view of the configuration address space.

In one example, the second view is a view of the root complex.

In one example, the system further includes system memory to store the mapping table, where the mapping portal bridge is to access the system memory to use the mapping table.

In one example, the system further includes system software to manage updates of the mapping table.

In one example, the system further includes the device.

In one example, the data is exchanged over one of a PCIe- or a Thunderbolt-compatible link.

Turning to FIG. 17B, in some cases, rather than detecting the coupling condition of another endpoint device (as in FIG. 17A), a device (e.g., 1705) can utilize remote receiver detection logic to detect and determine the coupling used by a link extension device 1715 positioned between two endpoints (e.g., 1705, 1710). Link extension devices 1715 can include such examples as repeaters, retimers, redrivers, and the link. For instance, in the particular example of FIG. 17B, a redriver 1715 can be coupled to an endpoint 1710 and the endpoint 1710 can detect whether the redriver 1715 utilizes DC- or AC-coupling. As in previous examples, based on detecting the coupling condition of the redriver 1715, the endpoint (e.g., 1710 (and/or 1705)) can configure its transmitter and receiver to operate compatibly with the detected coupling (i.e., AC or DC) used by the redriver 1715.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. An apparatus comprising:
   bridge logic to:
      receive a request from a device, wherein the request references an address of a secondary address space, the secondary address space corresponds to a subset of addresses in a configuration address space of a system, the secondary address space corresponds to a first view of the configuration address space, and addresses in the second address space each comprise a respective Peripheral Component Interconnect (PCI)-based bus-device-function (BDF) number, wherein the secondary address space comprises a particular one of a plurality of non-overlapping secondary address spaces, each of the plurality of secondary address spaces maps to a respective portion of the configuration address space, and a particular BDF number is used in both the particular secondary address space and another one of the plurality of secondary address spaces; and
      use a mapping table to translate the address of the particular secondary address space into a corresponding address in the configuration address space, wherein addresses of the configuration address space each comprise a respective PCI-based BDF number, and the mapping table maps BDF numbers in the secondary address space to BDF numbers in the configuration address space.

2. The apparatus of claim 1, wherein the second view of the configuration address space comprises a view of a root complex of the configuration address space.

3. The apparatus of claim 2, wherein the first view of the configuration address space comprises a view of the device of the configuration address space.

4. The apparatus of claim 1, wherein the configuration address space comprises a Peripheral Component Interconnect (PCI)-based configuration address space.

5. The apparatus of claim 1, wherein another subset of address in the configuration address space is mapped to addresses in a third another one of the plurality of secondary address spaces, and addressed in the other secondary address space each comprises a respective BDF number.

6. The apparatus of claim 1, wherein each address in the particular secondary address space maps to exactly one respective address in the configuration address space.

7. The apparatus of claim 1, wherein the configuration address space further comprises a subset of addresses reserved for hot-plugging.

8. The apparatus of claim 1, wherein addresses in the configuration address space are enumerated to maximize utilization of available bus addresses within the configuration address space.

9. The apparatus of claim 8, wherein addresses in the configuration address space are enumerated according to a first technique and addresses in the secondary address space are enumerated using a different second technique.

10. The apparatus of claim 9, wherein the second technique is agnostic to maximizing available bus addresses within the secondary address space.

11. The apparatus of claim 1, wherein the mapping table comprises two mapping tables, one for upstream translations, the second for downstream translations.

12. The apparatus of claim 1, wherein the mapping table is stored in system memory, a pointer in local memory points to the mapping table, and the bridge logic access the mapping table using the pointer.

13. The apparatus of claim 1, further comprising memory to store at least a portion of the mapping table locally for access by the bridge logic.

14. The apparatus of claim 1, wherein the bridge logic is further to:
   identify an update to the mapping table;
   invalidate a local copy of at least a portion of the mapping table; and
   replace the local copy with a new copy of at least a portion of the updated mapping table during runtime of the system.

15. At least one storage device within machine readable code stored thereon, the code executable by a processor to:
   manage mapping tables for access by a mapping portal bridge to translate configuration address space addresses between a primary address domain and a plurality of secondary address domains defined for a system, wherein the primary address domain comprises a view of the configuration address space as viewed upstream from the mapping portal bridge and the secondary address domains comprise respective views of the configuration address space as viewed downstream from the mapping portal bridge, the primary address domain comprises a particular bus-device-function (BDF) number space, and each of the secondary address domains in the plurality of secondary address domains comprises a respective secondary BDF number space, wherein the mapping tables map each of the plurality of secondary address spaces to respective portions of the primary address domain, and a particular BDF number is used in more than one of the plurality of secondary address domains;
   detect a change to the system; and
   update the mapping tables based on the change.

16. A system comprising:
   a root complex;
   a mapping portal bridge coupled to a device and receiving data exchanged between the device and the root complex, wherein the mapping portal bridge comprises logic to:
      receive a request from a device, wherein the request references an address of a secondary address space, wherein the secondary address space comprises one of a plurality of secondary address spaces and each of the plurality of secondary address spaces corresponds to a respective subset of addresses in a configuration address space of a system, each of the plurality of secondary address spaces corresponds to a first view of the configuration address space, addresses in the second address space each comprise a respective bus-device-function (BDF) number, and a same particular BDF number is reused in two or more of the plurality of second address spaces; and use a mapping table to translate the address of a particular one of the plurality of secondary address spaces into a corresponding address in the configuration address space, wherein addresses of the configuration address space each comprise a respective BDF number, and the mapping table maps BDF numbers in the secondary address space to BDF numbers in the configuration address space.

17. The system of claim 16, wherein the second view comprises a view of the root complex.

18. The system of claim 16, further comprising system software to manage updates of the mapping table.

* * * * *